United States Patent
Pluchery et al.

(10) Patent No.: US 11,192,181 B2
(45) Date of Patent: Dec. 7, 2021

(54) PROCESS FOR PREPARING A DICHROMATIC MATERIAL IN THE FORM OF A FILM

(71) Applicants: CENTRE NATIONAL DE LA RECHERCHE SCIENTIFIQUE, Paris (FR); UNIVERSITE PARIS DIDEROT-PARIS 7, Paris (FR); UNIVERSITE PARIS-SUD (PARIS XI), Orsay (FR)

(72) Inventors: Olivier Pluchery, Paris (FR); Hynd Remita Bosi, Orsay (FR); Delphine Schaming, Massy (FR)

(73) Assignees: CENTRE NATIONAL DE LA RECHERCHE SCIENTIFIQUE, Paris (FR); UNIVERSITE PARIS DIDEROT-PARIS 7, Paris (FR)

(*) Notice: Subject to any disclaimer, the term of this patent is extended or adjusted under 35 U.S.C. 154(b) by 0 days.

(21) Appl. No.: 15/745,007

(22) PCT Filed: Jul. 21, 2016

(86) PCT No.: PCT/FR2016/051902
§ 371 (c)(1),
(2) Date: Jan. 15, 2018

(87) PCT Pub. No.: WO2017/013373
PCT Pub. Date: Jan. 26, 2017

(65) Prior Publication Data
US 2018/0207720 A1    Jul. 26, 2018

(30) Foreign Application Priority Data
Jul. 22, 2015 (FR) .................. 15 56942

(51) Int. Cl.
*B22F 1/00* (2006.01)
*C09D 7/61* (2018.01)
(Continued)

(52) U.S. Cl.
CPC .............. *B22F 1/0022* (2013.01); *B22F 9/24* (2013.01); *B29D 11/00* (2013.01); *B32B 29/00* (2013.01);
(Continued)

(58) Field of Classification Search
CPC ...... B22F 1/0022; B22F 9/24; B22F 2999/00; C09D 7/61; C09D 7/67; C09D 5/29;
(Continued)

(56) References Cited

U.S. PATENT DOCUMENTS

| | | | |
|---|---|---|---|
| 2005/0141843 A1* | 6/2005 | Warden | G01N 15/14 385/141 |
| 2009/0047512 A1 | 2/2009 | Conroy | |
| 2013/0242297 A1* | 9/2013 | Thoniyot | B82Y 30/00 356/244 |

OTHER PUBLICATIONS

Walter Caseri: "Inorganic Nanoparticles as Optically Effective Additives for Polymers", Chemical Engineering Communications, vol. 196, No. 5, Dec. 15, 2008.
(Continued)

*Primary Examiner* — Ling Siu Choi
*Assistant Examiner* — Ronald Grinsted
(74) *Attorney, Agent, or Firm* — Ipsilon USA, LLP

(57) ABSTRACT

The invention relates to a process for preparing a dichromatic material, in the form of a translucent film, comprising monodisperse nanoparticles formed of gold and optionally of a noble metal chosen from platinum, palladium, silver and copper, and at least one organic macromolecule chosen from proteins, polysaccharides and synthetic polymers; said dichromatic material; and the uses thereof.

20 Claims, 4 Drawing Sheets a) 
b)

(51) Int. Cl.
*C09D 7/65* (2018.01)
*B22F 9/24* (2006.01)
*B29D 11/00* (2006.01)
*B32B 29/00* (2006.01)
*C03C 17/00* (2006.01)
*C03C 17/06* (2006.01)
*C03C 17/28* (2006.01)
*C08K 3/08* (2006.01)
*C09D 5/29* (2006.01)
*G02B 1/10* (2015.01)
*C09D 7/40* (2018.01)
*B82Y 20/00* (2011.01)

(52) U.S. Cl.
CPC ............ *C03C 17/008* (2013.01); *C03C 17/06* (2013.01); *C03C 17/28* (2013.01); *C08K 3/08* (2013.01); *C09D 5/29* (2013.01); *C09D 7/61* (2018.01); *C09D 7/67* (2018.01); *G02B 1/10* (2013.01); *B22F 2999/00* (2013.01); *B29D 11/00653* (2013.01); *B82Y 20/00* (2013.01); *C08K 2003/0806* (2013.01); *C08K 2003/0831* (2013.01); *C08K 2201/011* (2013.01)

(58) Field of Classification Search
CPC ... B29D 11/00; B29D 11/00653; B32B 29/00; C03C 17/008; C03C 17/06; C03C 17/28; C08K 3/08; C08K 2003/0806; C08K 2003/0831; C08K 2201/011; G02B 1/10; B82Y 20/00
USPC .......................................... 385/141; 252/582
See application file for complete search history.

(56) References Cited

OTHER PUBLICATIONS

D.J. Barber, I. C. Freestone: "An Investigation of the Origin of the Colour of the Lycurgus Cup by Analytical Transmission Electron Microscopy", Archaeometry, 1990,—1990, pp. 33-45.

Lu A H et al: Di chroic thin layer films 1-20 prepared from alkanethiol-coated gold nanoparticles 11 Journal of Physical Chemistry. B, Materials, Surfaces, Interfaces and Biophysical, Washington, DC, US, vol. 101, No. 45, Nov. 6, 1997.

Davids. Dos Santos et al: "Gold Nanoparticle Embedded, Self-Sustained Chitosan Films as Substrates for Surface-Enhanced Raman Scattering", LANGMUIR, vol. 20, No. 23, Nov. 1, 2004.

\* cited by examiner a)

b)

a)

b)

a)  b)

a)  b)

a)

b)

PROCESS FOR PREPARING A DICHROMATIC MATERIAL IN THE FORM OF A FILM

RELATED APPLICATION

This application is a National Phase of PCT/FR2016/051902, filed on Jul. 21, 2016, which in turn claims the benefit of priority from French Patent application No. 15 56942, filed on Jul. 22, 2015 the entirety of which are incorporated by reference.

FIELD OF THE INVENTION

The invention relates to a process for preparing a dichromatic material, in the form of a translucent film, comprising monodisperse gold nanoparticles and at least one macromolecule, to said dichromatic material and to the uses thereof.

It applies more particularly to materials that may exhibit two distinct colours to the naked eye, one colour in transmission and one colour in backscattering. Thus, when a light source is placed behind said material, this material appears a certain colour, referred to as the "transmission colour"; and when a light source is located on the same side as the observer (i.e. in front of said material), this material appears another colour referred to as the "backscattering colour", said backscattering colour being complementary to the transmission colour. It is noted that a pair of complementary colours is defined as a pair of colours which, mixed, cancel out the perception of colour, producing a neutral grey. Thus, a material having these characteristics is dichromatic, the dichromatic effect not being dependent on the angle of observation.

DESCRIPTION OF THE RELATED ART

This effect was observed for the first time in a decorative object from the 4th century, the Lycurgus cup, which is currently on display at the British Museum in London. Specifically, when the cup, made of glass, is lit from the outside (the light is reflected or backscattered), it is green and somewhat opaque. On the other hand, when the light source is placed on the inside (the light is transmitted), the cup appears red and translucent. Such a glass, referred to as ruby glass, is an antique object endowed with structural colours, that is to say tints due to the interactions of the light and of the structure of the illuminated material and not due to pigments. High-resolution microscope analysis of this cup made it possible to reveal its nanostructure, and in particular the presence of gold and silver metal nanoparticles having a size of around 70 nm, and also the presence of copper. However, to date no one has been able to discover and describe how the Roman glassmakers manufactured such a cup.

The use of a metal in the form of nanoparticles may make it possible to give a suspension or a solid substrate comprising said nanoparticles a colour different from the original colour of the solid metal (i.e. not being in the form of nanoparticles). Indeed, when a metal particle is subjected to an electromagnetic field, the wavelength of which is much greater than the size of the particles: $\lambda \gg \emptyset_{particles}$, all the free electrons of the conduction band are subjected to the same field and oscillate collectively and in phase. When the frequency of the incident wave corresponds to the natural frequency of these oscillations, a resonance phenomenon occurs, referred to as plasmon resonance. This resonance takes place in the visible range, only for gold, copper and silver, hence the particular coloration of the nanoparticles of these metals. Typically, gold nanoparticles of 20 nm have a plasmon resonance band at 520 nm (absorption in the green) and are red. The plasmon resonance frequency depends on the nature of the metal, on the size of the particle and on the shape thereof and also on the dielectric properties of the substrate or of the surrounding medium (e.g. suspension) and on inter-particle interactions. It is possible to adjust these various parameters in order to vary the colour of the gold nanoparticles throughout the visible range, or even to shift the plasmon resonance frequency into the near infrared.

Iwakoshi et al. [*Gold Bulletin*, 2005, 38/3, 107-112] described the preparation of a paste comprising up to 85% by weight of gold nanoparticles having a diameter ranging from 10 to 30 nm and a polymer material chosen from a water-soluble polyacrylate-based block copolymer (polymer-W) and a polyester-based block copolymer (polymer-S). These two polymers have secondary or tertiary amine functions on the main chain and can stabilize the gold nanoparticles. The paste may be obtained by a process comprising a step of bringing an aqueous solution of tetrachloroauric acid [$HAuCl_4$] into contact with one of the polymer materials possibly dissolved in an organic solvent, optionally a step of heating the mixture obtained up to around 50° C., a step of adding a reducing agent [2-(dimethylamino)ethanol], then a step of purification (deionization, ion exchange, evaporation, decantation, etc.). The paste is then used to produce a red thermosetting paint having a "flip-flop" or pearlescent effect (i.e. depending on the viewing angle and on the incidence, the colour varies), a red glass film or a polymer film with a metallic or golden appearance. Thus, the polymer film, the glass film and the paint do not have a dichromatic effect as defined in the invention, that is to say an optical effect that induces a colour in backscattering and a colour in transmission.

Pérez-Juste et al. [*Adv. Funct. Mater.*, 2005, 15, 1065-1071] described a process for preparing a polymer film comprising gold nanoparticles in the form of rods (having a length of around 33.7 nm and a width of around 13.7 nm) and polyvinyl alcohol, said process comprising a step of bringing a colloidal solution of said gold nanoparticles into contact with a polyvinyl alcohol solution, a step of drying the mixture obtained previously in order to obtain a film, a heating step and finally a step that consists in stretching the film. The heating and stretching steps make it possible to align the gold nanoparticles in a preferred direction. The polymer film thus obtained has optical properties which depend on the polarization of the light. Thus, under polarized light illumination, the film appears red or blue according to the direction of the incident electric field (i.e. parallel or perpendicular orientation of the polarization plane of the light relative to the axis of the fibres or the stretching direction of the film). Thus, such a polymer film does not have an optical effect that induces different colours in backscattering and in transmission.

There are numerous methods for synthesizing gold nanoparticles. It is however possible to list them in four main categories: 1) chemical synthesis in aqueous solution or in organic solution, 2) chemical synthesis on surfaces, 3) the preparation under ultra-high vacuum of gold nanoparticles deposited on a surface, and 4) the use of sources of aggregates and the sorting thereof by weight. Other methods used less frequently exist such as laser photoablation, sonolysis or intracellular reduction by various agents. The choice of the method of synthesis depends on the size of the nanoparticles, on their shape (spherical, oval, triangular, in the form of rods, in the form of decahedra, etc.) and on the packaging (nanoparticles in solution stabilized by a surfactant or deposited on a support) that it is desired to obtain depending on the envisaged application.

In particular, the Turkevich-Frens reduction method is known for preparing gold nanoparticles in aqueous solution (i.e. colloidal solution) [*Nature Physical Science*, 1973, 241, 20-22]. This method from the 1$^{st}$ category is based on reduction using a reducing agent (sodium citrate), a gold salt in which the gold is in the (+III) oxidation state (e.g. tetrachloroauric acid $HAuCl_4$ or potassium tetrachloroaurate $KAuCl_4$) to give metallic gold (0 oxidation state). The reducing agent also acts as a stabilizer or surfactant in order to promote the formation of gold nanoparticles. By precisely controlling the concentrations of reactants, this method results in spherical nanoparticles with a predictable diameter of between 12 and 30 nm, with very little variability in diameter (standard deviation over the diameters of the order of 1 nm).

OBJECTS AND SUMMARY

Thus, the objective of the present invention is to overcome the drawbacks of the aforementioned prior art and to provide a process for preparing a dichromatic material, that is to say a material that appears in two complementary colours depending on the lighting mode (transmission or backscattering light source), said process being simple, economical and enabling said two complementary colours to be effectively adjusted.

Another objective of the invention is to provide a dichromatic material, that is to say that appears in two complementary colours depending on the lighting mode (transmission or backscattering light source) which is economical, can be easily handled and used in many applications, and in particular in the automotive, agri-food or luxury (cosmetics, sunglasses or corrective glasses, etc.) field.

These objectives are achieved by the invention which will be described hereinbelow.

A first subject of the invention is therefore a process for preparing a dichromatic material in the form of a translucent film, said dichromatic material comprising monodisperse nanoparticles formed of gold and optionally of a noble metal chosen from platinum, palladium, silver and copper (NPs), and at least one organic macromolecule chosen from proteins, polysaccharides and synthetic polymers, said process comprising the following steps:

i) a step of mixing at least one organic macromolecule chosen from proteins, polysaccharides and synthetic polymers with a colloidal suspension $S_0$ of NPs, and ii) a step of drying the mixture from step i), in order to form a dichromatic material in the form of a translucent film deposited on a support, said process being characterized in that:

the NPs are in spherical form and have a diameter ranging from 70 to 100 nm approximately, and preferably ranging from 75 to 90 nm approximately, the molar concentration of gold in the mixture from step i) ranges from $10^{-4}$ to $5 \times 10^{-1}$ mol/l approximately, and preferably from $2 \times 10^{-4}$ to $5 \times 10^{-3}$ mol/l approximately, the molar concentration of macromolecule in the mixture from step i) ranges from 0.001 to 5 mol/l approximately, preferably from 0.01 to 2 mol/l approximately, and more preferably from 0.1 to 1 mol/l approximately, the film has a volume density ranging from $0.5 \times 10^{10}$ to $5.0 \times 10^{10}$ NPs/cm$^3$ approximately for a 1 mm film thickness E, and preferably from $1.0 \times 10^{10}$ to $3.0 \times 10^{10}$ NPs/cm$^3$ approximately for a 1 mm film thickness E, and said material has two complementary colours distinct to the naked eye, one colour in transmission and one colour in backscattering.

In the present invention, the expression "monodisperse nanoparticles formed of gold and optionally of a noble metal chosen from platinum, palladium, silver and copper" is also referred to as "NPs".

In the present invention, the expression "colloidal suspension of NPs" means a colloidal suspension comprising NPs.

In the invention, since the NPs are monodisperse, they therefore have substantially the same diameter. In particular, they have a standard deviation over the diameters ranging from 1 to 15 nm approximately, and preferably from 1 to 10 nm approximately.

According to one preferred embodiment of the invention, the NPs have a diameter $d = d_0 \pm \varepsilon$, with $\varepsilon < 0.2 \times d_0$.

The gold (respectively the noble metal) is in the zero oxidation state in the mixture from step i) and in the dichromatic material of the invention.

The noble metal is preferably chosen from platinum, silver and copper.

In the present invention, the term "dichromatic material" means a material that exhibits two complementary colours distinct to the naked eye, one colour in transmission and one colour in backscattering. Thus, when a light source is placed behind said material (i.e. the material is then between the light and the observer), this material appears a certain colour, referred to as the "transmission colour"; and when a light source is located on the same side as the observer (i.e. in front of said material), this material appears another colour referred to as the "backscattering colour", said backscattering colour being complementary to the transmission colour.

Thus, in the invention, two complementary colours are obtained when transmission and backscattering are compared, without using polarization. The dichromatism phenomenon of the invention is furthermore the same irrespective of the polarization of the light.

The colour of a material in transmission is explained by its ability to absorb a wavelength range in the visible spectrum (400-800 nm). The visual perception of the colours becomes substantial when the maximum of the absorption is equal to at least 0.01 absorbance unit and the human eye perceives the complementary colour. In the present case, the absorption is caused by the plasmon resonance of the NPs. The colour of a material in backscattering is explained by its ability to scatter the light while having a scattering maximum. The inventors of the present invention have surprisingly discovered a process that makes it possible to optimize dichromatic perception, using the fact that the absorption and scattering coefficients of the material may be rendered substantially equal. This effect is based on plasmon resonance and that assumes the use of NPs of the aforementioned sizes (i.e. diameters of 70-100 nm).

In the invention, the expression "translucent film" means a film having an optical transmission coefficient ranging from 10% approximately to 80% approximately, measured by a conventional UV-visible spectrometer.

The translucent characteristic of the film obtained by the process of the invention depends on its thickness.

The optical transmission coefficient is generally measured at a wavelength of 490 nm with a conventional UV-visible spectrometer. This coefficient is identical irrespective of the orientation, from one side or from another, of the film during the measurement.

The film obtained according to the process of the invention has a volume density ranging from $0.5 \times 10^{10}$ to $5.0 \times 10^{10}$ NPs/cm$^3$ approximately for a 1 mm film thickness E, and preferably from $1.0 \times 10^{10}$ to $3.0 \times 10^{10}$ NPs/cm$^3$ approximately for a 1 mm film thickness E. In other words, the film obtained by the process of the invention has a volume density $D_v$ varying from $D_{v1} = (0.5 \times 10^{10})/E$ NPs/cm$^3$ approximately to $D_{v2} = (5.0 \times 10^{10})/E$ NPs/cm$^3$ approximately, and preferably varying from $D_{v1'} = (1.0 \times 10^{10})/E$ NPs/cm$^3$ approximately to $D_{v2'} = (3.0 \times 10^{10})/E$ NPs/cm$^3$ approximately, E being the thickness of the film in mm.

In the invention, the expression "organic macromolecule" means an organic molecule (i.e. comprising at least carbon and hydrogen atoms, and optionally oxygen and/or nitrogen and/or sulphur, etc. atoms) or an assembly of organic molecules that has a molar mass or an average molar mass of at least 25 000 g/mol approximately, preferably of at least 50 000 g/mol approximately, and more preferably of at least 100 000 g/mol approximately. The organic macromolecule of the invention does not induce the precipitation of the NPs.

An organic macromolecule of the present invention may result from biological processes or else be prepared using chemical reactions.

Proteins (i.e. polypeptides) result from the condensation of amino acids by formation of peptide bonds.

As an example of a protein, mention may be made of gelatin.

Gelatin is a degradation product of collagen, it is by nature heterogeneous and is therefore composed of an assembly of organic molecules. Its molar mass is consequently an average molar mass.

Polysaccharides are polymers formed of several monosaccharides bonded together by O-glycosidic bonds.

The polysaccharides may be chosen chitosan, chitin, cellulose, cellophane, agar-agar, starch, gum arabic or a mixture thereof.

The synthetic polymers result from the covalent linking of a large number of identical or different monomer units by polymerization of said units.

The synthetic polymers may be chosen from polyvinyl alcohols (PVAs), polyelectrolytes, epoxy resins, polydimethylsiloxanes (PDMSs), polymethyl methacrylates (PMMAs), polyvinylpyrrolidones (PVPs), polyethylene glycols, polystyrenes, polyethylenes, polypropylenes, polyvinyl chlorides, polyamides, polyesters, poly(N-isopropylacrylamides) and a mixture thereof, and preferably chosen from polyvinyl alcohols (PVAs), polymethyl methacrylates (PMMAs), polyvinylpyrrolidones (PVPs), polyethylene glycols, polystyrenes, polyethylenes, polypropylenes, polyvinyl chlorides, polyamides, polyesters, poly(N-isopropylacrylamides) and a mixture thereof.

The synthetic polymers, and in particular polyvinyl alcohol, are preferred.

In one particular embodiment, the organic macromolecule is a protein such as gelatin or a synthetic polymer such as polyvinyl alcohol.

In the present invention, the molar concentration of macromolecule in the mixture from step i) corresponds to the molar concentration of the monomer of the macromolecule in the mixture from step i).

By way of example, when polyvinyl alcohol is used, its concentration is calculated by measuring the concentration of the monomer in the mixture, that is to say the concentration of vinyl alcohol (of empirical formula $C_2H_4O$) in the mixture.

The film may have a thickness E ranging from 10 μm approximately to 10 mm approximately, and preferably from 0.5 to 3 mm approximately.

The thickness E of the film is probably substantially constant.

In the invention, the expression "substantially constant thickness" means that there may be a thickness variation of the film of at most 30% approximately of the minimum thickness, and preferably of at most 20% approximately of the minimum thickness.

The support is preferably a flat support. Therefore, it makes it possible, during step ii), to facilitate the formation of a film of substantially constant thickness E deposited on said flat support.

The support is preferably a transparent or translucent substrate.

The transparent or translucent substrate may be made of glass, glass-ceramic, ceramic, plastic or cellulose paper.

In the invention, the expression "transparent or translucent substrate" means a substrate that is transparent to visible light or a substrate that only transmits a portion of this visible light. A substrate is said to be transparent when its optical transmission coefficient is between 80% and 100% measured by a conventional UV-visible spectrometer. A substrate is said to be translucent when its optical transmission coefficient is between 10% and 80% measured by a conventional UV-visible spectrometer.

The mixture from step i) may comprise additives such as plasticizers, film-forming agents or surfactants, said additives not bringing about, alone or as a mixture with other elements, the precipitation of the NPs.

The colloidal suspension $S_0$ from step i) may be an aqueous colloidal suspension or an organic colloidal suspension. An aqueous colloidal suspension is preferred, in particular of distilled water or of ultra pure distilled water.

When $S_0$ is an aqueous colloidal suspension, it preferably comprises at least 80% by volume approximately of water, and more preferably at least 90% by volume approximately of water, relative to the total volume of liquid in the colloidal suspension $S_0$.

When $S_0$ is an organic colloidal suspension, it preferably comprises at least 80% by volume approximately of an organic solvent, and more preferably at least 90% by volume approximately of an organic solvent, relative to the total volume of liquid in the colloidal suspension $S_0$.

The organic solvent may be toluene, benzene or an alcohol.

The colloidal suspension $S_0$ from step i) may comprise from $10^{-4}$ to $5 \times 10^{-1}$ mol/l, approximately, and preferably from $2 \times 10^{-4}$ to $5 \times 10^{-3}$ mol/l approximately of gold.

The colloidal suspension $S_0$ as described in the invention has dichromatic properties, and is therefore a dichromatic colloidal suspension.

According to a first embodiment, the NPs of the colloidal suspension $S_0$ are formed solely of gold.

According to a second embodiment, the NPs of the colloidal suspension $S_0$ are formed of gold and of a noble metal chosen from silver, palladium, copper and platinum.

According to this second embodiment, the NPs may be in the form of monodisperse nanoparticles of a gold/noble metal alloy or in the form of "core/shell" monodisperse nanoparticles and formed of a noble metal core and a gold shell.

According to this second embodiment, the molar concentration of noble metal chosen from silver, palladium, copper and platinum in the mixture from step i) ranges from $10^{-4}$ to $5\times10^{-1}$ mol/l approximately, and preferably from $2\times10^{-4}$ to $5\times10^{-3}$ mol/l approximately.

According to this second embodiment, the molar ratio R=concentration of gold (in mol/l)/concentration of noble metal (in mol/l) in the mixture from step i) ranges from 1 to 1000 approximately, and preferably from 1 to 20 approximately.

When the monodisperse nanoparticles are in the "core/shell" form, the diameter of the noble metal core is preferably at most 50 nm approximately.

The process of the invention may additionally comprise, between step i) and step ii), a step i-1) of applying the mixture from step i) to a support as defined in the invention.

This embodiment is particularly suitable when step i) is carried out in a container that is not used as support during step ii), in particular when it is not suitable for being able to be used as support for the drying of step ii) (e.g. reaction round-bottomed flask).

Thus, after drying of the mixture according to step ii), a film of said dichromatic material deposited on said support is obtained.

This application step may be carried out using a brush or by spraying, in particular using a compressed air gun.

Steps i-1) and ii) may be repeated several times, so as to form several layers of film deposited on said support.

After step ii), the process may additionally comprise a step ii-1) of depositing a transparent or translucent substrate as support on the dichromatic film obtained in step ii). A transparent substrate deposited on a dichromatic film, itself deposited on a support, is then obtained.

Next, steps i-1), ii) and ii-1) may be repeated several times, so as to form several layers of [transparent substrate/dichromatic film] deposited on said support.

According to one preferred embodiment of the invention, step i) is carried out by mixing in a container (e.g. crystallizing dish) comprising at least one inner surface suitable for receiving said mixture:

said colloidal suspension $S_0$ comprising NPs, said colloidal suspension $S_0$ comprising from $10^{-4}$ to $5\times10^{-1}$ mol/l approximately, and preferably from $2\times10^{-4}$ to $5\times10^{-3}$ mol/l approximately of gold, with a solution $S_0'$ comprising at least one organic macromolecule as defined in the present invention, said solution $S_0'$ comprising from $10^{-3}$ mol/l to 5 mol/l approximately, and preferably from $5\times10^{-3}$ to 2 mol/l approximately of organic macromolecule, it being understood that:

the volume ratio: volume of the colloidal suspension $S_0$/volume of the solution $S_0'$ ranges from 0.1 to 100 approximately, and preferably from 0.5 to 5 approximately, and the resulting solution or colloidal suspension (i.e. the mixture) has a height H in the container ranging from 0.1 to 30 mm approximately, and preferably from 0.8 to 20 mm approximately.

In one preferred embodiment, the inner surface of said container acts as support for step ii) [i.e. concomitant steps i) and i-1)] and step ii) is carried out by directly drying said container comprising said mixture. A film of said dichromatic material deposited on said inner surface of the container is thus obtained.

The solution $S_0'$ may be an aqueous solution or an organic solution. An aqueous solution is preferred, in particular of distilled water or of ultra pure distilled water.

When $S_0'$ is an aqueous solution, it preferably comprises at least 80% by volume approximately of water, and more preferably at least 90% by volume approximately of water, relative to the total volume of liquid in the solution $S_0'$.

When $S_0'$ is an organic solution, it preferably comprises at least 80% by volume approximately of an organic solvent, and more preferably at least 90% by volume approximately of an organic solvent, relative to the total volume of liquid in the solution $S_0'$.

The organic solvent may be dichloromethane or an alcohol.

This embodiment is particularly suitable when $S_0$ is an aqueous colloidal suspension and $S_0'$ is an aqueous solution (e.g. 100% of optionally ultra pure distilled water) and the organic macromolecule is soluble in $S_0$ and $S_0'$.

However, it may be adapted by techniques well known to a person skilled in the art (e.g. phase transfer steps) in order to be used when $S_0$ is an aqueous colloidal suspension, $S_0'$ is an organic solution and the organic macromolecule is not soluble in $S_0$. The phase transfer may comprise bringing the aqueous colloidal suspension $S_0$ into contact with the organic solution $S_0'$ then the mechanical stirring of the resulting mixture or the use of ultrasonic waves on said resulting mixture. The NPs migrate from the aqueous phase to the organic phase if the stabilizer allows it.

In the present invention, the molar concentration of macromolecule in the solution $S_0'$ corresponds to the molar concentration of the monomer of the macromolecule in the solution $S_0'$.

By way of example, when polyvinyl alcohol is used, its concentration is calculated by measuring the concentration of monomer in the solution $S_0'$, that is to say the concentration of vinyl alcohol (of empirical formula $C_2H_4O$) in the solution $S_0'$.

Step ii) may be carried out at a temperature ranging from 50° C. to 150° C. approximately, and preferably ranging from 60° C. to 80° C. approximately, in particular in an oven.

Step ii) makes it possible to evaporate the solvents used during step i). This drying step may also enable the polymerization and optionally the crosslinking of the organic macromolecule.

Step ii) may last from 30 min to 24 h approximately, and preferably from 3 h to 8 h approximately.

The process may additionally comprise, after step ii), a step iii) of heat treatment at a temperature ranging from 20° C. to 200° C. approximately, and preferably ranging from 60° C. to 120° C., for example in an oven.

Step iii) may make it possible to terminate the polymerization and optionally the crosslinking following the drying step ii) depending on the organic macromolecule used.

The process may additionally comprise, after step ii) or after step iii), a step iv) during which the film of dichromatic material is removed or unstuck from said support.

The process of the invention makes it possible to obtain a dichromatic material, in the form of a translucent film, comprising NPs and at least one organic macromolecule, said NPs being stable in said organic macromolecule.

Therefore, the film is homogeneous and the NPs are uniformly distributed in said film. The dichromatic effect is also stable over time. In addition, the process of the invention prevents the precipitation of the NPs during steps i), i-1), ii), iii) and iv) and thus their agglomeration which may lead to the loss of the dichromatic effect.

The dichromatic material in the form of a translucent film is preferably formed solely of NPs and of one or more organic macromolecule(s) in order to avoid the presence of elements that could reduce or cancel out the desired dichromatic effect.

According to one particularly preferred embodiment of the invention, the colloidal suspension $S_0$ as defined in the invention (i.e. comprising NPs in spherical form and having a diameter ranging from 70 to 100 nm approximately, and preferably ranging from 75 to 90 nm approximately), is prepared beforehand according to the following steps:

A) a step of preparing a colloidal suspension comprising seeds of a metal chosen from gold, platinum, palladium, copper and silver, and preferably chosen from gold, platinum, silver and copper, said metal seeds being in spherical form and having a diameter ranging from 1 to 30 nm approximately, and preferably from 1 to 15 nm approximately, said aqueous colloidal suspension comprising a molar concentration of metal ranging from $5 \times 10^{-5}$ to $10^{-2}$ mol/l approximately, and preferably ranging from $1 \times 10^{-4}$ to $2 \times 10^{-3}$ mol/l approximately, and B) a step of preparing a colloidal suspension $S_0$ as defined in the present invention from the colloidal suspension comprising seeds from step A).

This process makes it possible more particularly to obtain nanoparticles in "core/shell" form when the seeds are seeds of a metal chosen from platinum, palladium, copper and silver, preferably chosen from platinum, copper and silver.

Step A) may be carried out by the aforementioned Turkevich-Frens method, by radiolysis or by irradiation, in particular according to techniques well known to a person skilled in the art [Abidi et al., *Light-driven reactions and materials in the environmental technology*, 2010, 4, 3, 170-188; Abidi et al., *J. Phys. Chem. C*, 2010, 114, 35, 14794-14803; Singh et al., *J. Phys. Chem. Lett.*, 2013, 4, 3958-3961].

The colloidal suspension from step A) may be an aqueous colloidal suspension or an organic colloidal suspension. An aqueous colloidal suspension is preferred, in particular of distilled water or of ultra pure distilled water.

When the colloidal suspension from step A) is an aqueous colloidal suspension, it preferably comprises at least 80% by volume approximately of water, and more preferably at least 90% by volume approximately of water, relative to the total volume of liquid in said colloidal suspension.

When the colloidal suspension from step A) is an organic colloidal suspension, it preferably comprises at least 80% by volume approximately of an organic solvent, and more preferably at least 90% by volume approximately of an organic solvent, relative to the total volume of liquid in said colloidal suspension.

The organic solvent may be toluene, benzene or an alcohol.

According to one particularly preferred embodiment of the invention, the seeds are gold seeds and step A) comprises:

a substep $A_1$) of heating to boiling point a solution $S_1$ comprising at least one gold salt in which the gold is in the (+III) or (+I) oxidation state, the molar concentration of $[Au^{3+}]$ or $[Au^+]$ gold ions in said aqueous solution $S_1$ ranging from $5 \times 10^{-5}$ to $10^{-2}$ mol/l approximately, and preferably ranging from $1 \times 10^{-4}$ to $2 \times 10^{-3}$ mol/l approximately, a substep $A_2$) of mixing the solution $S_1$ from substep $A_1$) with a solution $S_2$ comprising at least one reducing agent and optionally a stabilizer, the molar concentration of reducing agent in said solution $S_2$ [Reducing agent] ranging from $5 \times 10^{-5}$ mol/l approximately to $5 \times 10^{-1}$ mol/l approximately, and preferably ranging from $5 \times 10^{-3}$ mol/l approximately to $2 \times 10^{-1}$ mol/l approximately, it being understood that the molar ratio: number of moles of reducing agent/number of moles of $Au^{3+}$ or $Au^+$ gold ions ranges from 0.1 to 20 approximately, and preferably from 0.2 to 10 approximately, a substep $A_3$) of maintaining the heating to boiling point of the mixture from substep $A_2$) until the gold (III) or the gold (I) has been completely reduced to gold (0), and a substep $A_4$) of cooling to ambient temperature in order to obtain a colloidal suspension comprising seeds as defined in the present invention.

When the gold is in the (+III) oxidation state, the gold salt may be chosen from tetrachloroauric acid $HAuCl_4$, potassium tetrachloroaurate $KAuCl_4$ and the mixture thereof.

When the gold is in the (+I) oxidation state, the gold salt may be gold cyanide.

A salt in which the gold is in the (+III) oxidation state is preferred.

The reducing agent may be chosen from sodium citrate, sodium borohydride, hydrazine, hydroquinone and a mixture thereof.

When the reducing agent has stabilizing or surfactant properties, as is the case for sodium citrate, the solution $S_2$ comprises no additional stabilizer.

When the reducing agent does not have stabilizing or surfactant properties, the solution $S_2$ comprises a stabilizer.

The stabilizer may be chosen from polymers such as polyvinyl alcohol or polyacrylic acid, poly(ethylene glycol) (PEG), sulfur derivatives such as thiols, triphenylphosphine-based ligands, dendrimers, surfactants such as cetyltrimethylammonium bromide (CTAB), sodium dodecylsulfate (SDS) or amine surfactants.

The concentration of stabilizer in said solution $S_2$ may range from $10^{-3}$ mol/l approximately to $5 \times 10^{-1}$ mol/l approximately, and preferably from $2 \times 10^{-3}$ mol/l approximately to $10^{-2}$ mol/l approximately.

The solution $S_1$ (respectively $S_2$) may be an aqueous solution or an organic solution. An aqueous solution is preferred, in particular of distilled water or of ultra pure distilled water.

When $S_1$ (respectively $S_2$) is an aqueous solution, it preferably comprises at least 80% by volume approximately of water, and more preferably at least 90% by volume approximately of water, relative to the total volume of liquid in said solution $S_1$ (respectively $S_2$).

When $S_1$ (respectively $S_2$) is an organic solution, it preferably comprises at least 80% by volume approximately of an organic solvent, and more preferably at least 90% by volume approximately of an organic solvent, relative to the total volume of liquid in said solution $S_1$ (respectively $S_2$).

The organic solvent may be toluene, benzene or an alcohol.

In the present invention, the resistivity of the ultra pure water is preferably at least 10 MΩ·cm, as measured by a MilliQ water generator at 25° C. (water purifiers sold by Merck-Millipore).

Step B) makes it possible, starting from the seeds of step A), to form NPs in colloidal suspension in spherical form and having a diameter ranging from 70 to 100 nm approximately, and preferably ranging from 75 to 90 nm approximately (i.e. to form a colloidal suspension $S_0$ as defined in the present invention).

The NPs in colloidal suspension (i.e. colloidal suspension $S_0$) at the end of step B) cannot be stored in powder form, they are necessarily stored in colloidal suspension.

It is not necessary to eliminate the by-products, the reducing agent and the stabilizer before step i). These compounds may be present in the dichromatic material of the invention since they do not impair the optical properties of said film.

It should be noted that it is not possible to form directly, during step A), NPs in spherical form and having a diameter ranging from 70 to 100 nm approximately, and preferably ranging from 75 to 90 nm approximately.

This is because the methods of synthesis known to a person skilled in the art, although enabling particles to be formed in spherical form and having a diameter ranging from 70 to 100 nm approximately (cf. aforementioned Turkevich-Frens method), cannot result in monodisperse particles. Specifically, the preparation of gold nanoparticles having a diameter of greater than 30 nm in a single step results in polydisperse nanoparticles, leading to an impairment of the dichromatic effect of the final material obtained.

According to one particularly preferred embodiment of the invention, the seeds are gold seeds and step B) comprises:
- a substep $B_1$) of heating to boiling point a solution $S_3$ comprising at least one gold salt in which the gold is in the (+III) or (+I) oxidation state, the concentration of [$Au^{3+}$] or [$Au^+$] gold ions in said solution $S_3$ ranging from $10^{-4}$ mol/l approximately to 0.1 mol/l approximately, and preferably ranging from $5\times10^{-4}$ mol/l approximately to $10^{-2}$ mol/l approximately,
- a substep $B_2$) of mixing the solution $S_3$ from substep $B_1$) with the colloidal suspension comprising seeds as obtained in step A) or in substep $A_4$), it being understood that the molar ratio defined by the number of moles of $Au^{3+}$ or $Au^+$ gold ions of the solution $S_3$/the number of moles of $Au^0$ gold of the colloidal suspension of gold seeds ranges from 5 to 1000 approximately, and preferably from 10 to 100 approximately,
- a substep $B_3$) of mixing a solution $S_4$ comprising at least one reducing agent and optionally a stabilizer with the mixture from substep $B_2$), the concentration of reducing agent in said solution $S_4$ [Reducing agent] ranging from $2\times10^{-5}$ mol/l approximately to 2 mol/l approximately, and preferably ranging from $10^{-4}$ mol/l approximately to 0.7 mol/l, it being understood that the molar ratio: number of moles of reducing agent/number of moles of $Au^{3+}$ or $Au^+$ gold ions ranges from 0.1 to 10 approximately, and preferably from 0.1 to 3 approximately,
- a substep $B_4$) of maintaining the heating to boiling point of the mixture from substep $B_3$) until the gold (III) or the gold (I) has been completely reduced to gold (0), and
- a substep $B_5$) of cooling to ambient temperature in order to obtain a colloidal suspension $S_0$ as defined in the present invention.

The gold salt and the reducing agent are as defined above.

The concentration of stabilizer in said solution $S_4$ may range from $10^{-3}$ mol/l approximately to 1 mol/l approximately, and preferably from $2\times10^{-3}$ mol/l approximately to 0.1 mol/l approximately.

The solution $S_3$ (respectively $S_4$) may be an aqueous solution or an organic solution. An aqueous solution is preferred, in particular of distilled water or of ultra pure distilled water.

When $S_3$ (respectively $S_4$) is an aqueous solution, it preferably comprises at least 80% by volume approximately of water, and more preferably at least 90% by volume approximately of water, relative to the total volume of liquid in said solution $S_3$ (respectively $S_4$).

When $S_3$ (respectively $S_4$) is an organic solution, it preferably comprises at least 80% by volume approximately of an organic solvent, and more preferably at least 90% by volume approximately of an organic solvent, relative to the total volume of liquid in said solution $S_3$ (respectively $S_4$).

The organic solvent may be toluene, dichloromethane, benzene or an alcohol.

The dichromatic material in film form obtained by the process in accordance with the first subject of the invention may be applied to any type of transparent or translucent substrate such as plastic packagings, bottles, in particular glass bottles, cellulose paper, etc.

According to a first variant, the support from step ii) is a transparent or translucent substrate. In this case, the assembly obtained (dichromatic film+substrate) exhibits a dichromatic effect and can be directly used in applications as defined in the present invention.

According to a second variant, the support from step ii) is not a transparent or translucent substrate. In this case, the process additionally comprises, after step iv), a step v) of applying the dichromatic film to a transparent or translucent substrate.

This step v) may be carried out by bonding, in particular using an adhesive.

The transparent or translucent substrate may be made of glass, glass-ceramic, ceramic, plastic or cellulose paper.

A second subject of the invention is a dichromatic material in the form of a translucent film as obtained according to the process in accordance with the first subject, said dichromatic material comprising NPs and at least one organic macromolecule chosen from proteins, polysaccharides and synthetic polymers, said material being characterized in that it has two complementary colours distinct to the naked eye, one colour in transmission and one colour in backscattering and in that:
- the NPs are in spherical form and have a diameter ranging from 70 to 100 nm approximately, and preferably ranging from 75 to 90 nm approximately, and
- said film has a volume density ranging from $0.5\times10^{10}$ to $5.0\times10^{10}$ NPs/cm$^3$ approximately for a 1 mm film thickness E, and preferably from $1.0\times10^{10}$ to $3.0\times10^{10}$ NPs/cm$^3$ approximately for a 1 mm film thickness E.

The material of the invention is a homogeneous film in which the NPs are uniformly distributed. The dichromatic effect is stable over time.

The film may have a thickness E ranging from 10 μm approximately to 10 mm approximately, and preferably from 0.5 to 3 mm approximately.

It should be noted that when the film has a thickness of 100 μm, i.e. a thickness 10 times smaller than if its thickness was 1 mm, its volume density is 10 times higher to obtain the same dichromatic effect, i.e. a density ranging from $0.5\times10^{11}$ to $5.0\times10^{11}$ NPs/cm$^3$ approximately for a 100 μm film thickness E, and preferably from $1.0\times10^{11}$ to $3.0\times10^{11}$ NPs/cm$^3$ approximately for a 100 μm film thickness E. In other words, the film has a volume density $D_v$ varying from $D_{v1}=(0.5\times10^{10})/E$ NPs/cm$^3$ approximately to $D_{v2}=(5.0\times10^{10})/E$ NPs/cm$^3$ approximately, and preferably varying from $D_{v1}=(1.0\times10^{10})/E$ NPs/cm$^3$ approximately to $D_{v2}=(3.0\times10^{10})/E$ NPs/cm$^3$ approximately, E being the thickness of the film in mm.

The thickness E of the film is preferably substantially constant.

A third subject of the invention is the use of a dichromatic material in the form of a translucent film as obtained according to the process in accordance with the first subject of the invention or in accordance with the second subject of the invention for coating a transparent or translucent substrate.

The transparent or translucent substrate may be made of glass, glass-ceramic, ceramic, cellulose paper or plastic.

A fourth subject of the invention is the use of a dichromatic material in the form of a translucent film as obtained according to the process in accordance with the first subject of the invention or in accordance with the second subject of the invention as means of authentication (e.g. particular signature, obvious marking or non-obvious marking), decoration or protection.

As means of authentication, it may be used:
- for marking packagings in the agri-food field, in particular when the substrate is made of plastic, or
- for solving problems of falsification and counterfeiting of payment items and official documents since no photocopying system enables the reproduction of the dichromatic effects of said material, for example by marking security papers.

As means of protection, the dichromatic material of the invention may prove useful for coating windows of houses or cars in hot countries, so that they reflect the heat while allowing the light to pass through the glass, thus reducing the need for air conditioning.

It may also be used to coat sunglasses or corrective glasses.

It may be envisaged for laser protection shields or filters.

As means of decoration, the dichromatic material of the invention may also be used in the luxury field, in particular for decorating perfume bottles, bottles of cosmetic lotions or jewels; or in the field of mass retailing for decorating any type of transparent or translucent object, such as vases, light fittings, etc.

DETAILED DESCRIPTION

Examples

Figure 1:
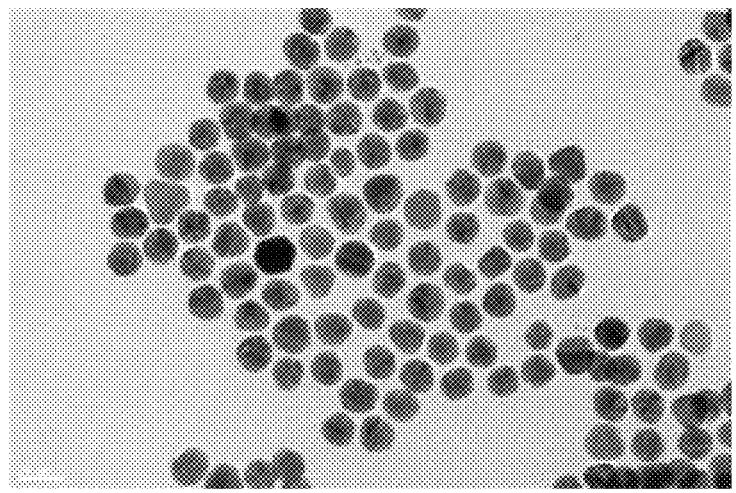
FIG. 1a shows the gold seeds obtained at the end of step A) by transmission electron microscopy (TEM), from example 1 in accordance with one embodiment.
FIG. 1b shows a UV-visible absorption spectrum of such a colloidal suspension, obtained through a 1 mm thick cuvette, from example 1 in accordance with one embodiment.
Figure 1:
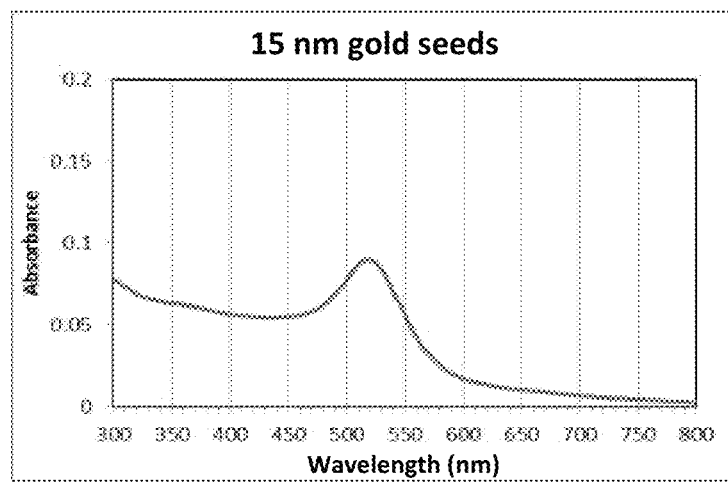

The raw materials used in the examples are listed below:
potassium tetrachloroaurate $KAuCl_4$, purity 99.995%, Sigma-Aldrich,
Milli-Q ultra pure distilled water, resistivity 18.2 MΩ·cm, Merck Millipore,
trisodium citrate dihydrate, purity 99%, Sigma-Aldrich,
polyvinyl alcohol, purity 99%, molar mass 86 000 g/mol, Sigma-Aldrich,
gelatin powder, 24350.262, VWR, Prolabo.

Unless otherwise indicated, all the materials were used as received from the manufacturers.

Example 1

Manufacture of a Dichromatic Material in Accordance with the Invention and as Obtained According to the Process in Accordance with the Invention 1.1 Preparation of the Aqueous Colloidal Suspension of Gold Seeds [Step A) of the Process in Accordance with the Invention]

An aqueous solution comprising 9.45 mg of potassium tetrachloroaurate in 100 ml of ultra pure distilled water was prepared and brought to boiling. The concentration of $[Au^{3+}]$ gold ions in said aqueous solution was 0.25 mmol/l.

An aqueous solution comprising 100 mg of trisodium citrate in 10 ml of ultra pure distilled water was prepared. The concentration of trisodium citrate in said aqueous solution was 34 mmol/l.

5 ml of the aqueous sodium citrate solution were added to the 100 ml of aqueous tetrachloroaurate solution.

The resulting mixture was maintained at boiling until the gold (III) was completely reduced to gold (0) (the solution becomes red), then it was cooled to ambient temperature.

An aqueous colloidal suspension of gold seeds in spherical form and having a diameter of 15 nm approximately was obtained and comprised $2.4 \times 10^{-4}$ mol/l of gold.

FIG. 1a shows the gold seeds obtained at the end of step A) by transmission electron microscopy (TEM). They have a diameter of 15 nm approximately.

The images obtained by transmission electron microscopy in the present invention were produced using a microscope sold under the trade name 100 CX II by JEOL.

FIG. 1b shows a UV-visible absorption spectrum of such a colloidal suspension, obtained through a 1 mm thick cuvette. This spectrum was obtained with a CARY 5000 spectrometer from Agilent.

1.2 Preparation of the Aqueous Colloidal Suspension of Gold Nanoparticles [Step B) of the Process in Accordance with the Invention]

An aqueous solution comprising 3.78 mg of potassium tetrachloroaurate in 10 ml of ultra pure distilled water was prepared and brought to boiling. The concentration of $[Au^{3+}]$ gold ions in said aqueous solution was 1 mmol/l.

1 ml of the aqueous colloidal suspension of gold seeds as prepared in example 1.1 above was added to the aqueous tetrachloroaurate solution.

The molar ratio: number of moles of $Au^{3+}$ gold ions of the aqueous solution/number of moles of $Au^0$ gold of the aqueous solution of gold seeds was 41.7.

150 µl of the aqueous sodium citrate solution previously prepared in example 1.1 were added to the aqueous solution of tetrachloroaurate and gold seeds.

The resulting mixture was maintained at boiling until the gold (III) was completely reduced to gold (0) (the solution becomes brown/violet), then it was cooled to ambient temperature.

An aqueous colloidal suspension of monodisperse gold nanoparticles in spherical form and having a diameter of 85 nm approximately was obtained and comprised 0.92 mmol/l of gold.

Figure 2:
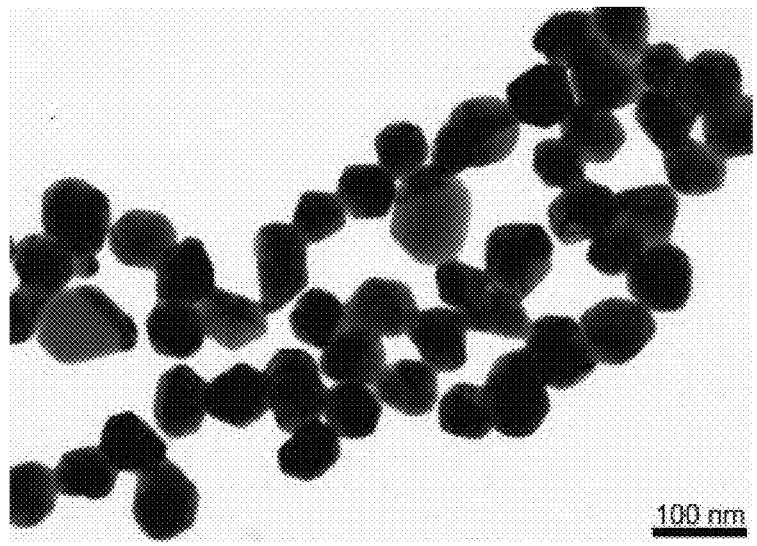
FIG. 2a shows the gold nanoparticles obtained at the end of step B) by transmission electron microscopy (TEM), from example 1 in accordance with one embodiment.
FIG. 2b shows a UV-visible spectrum of these NPs. They have a diameter of 85 nm approximately, from example 1 in accordance with one embodiment.
Figure 2:
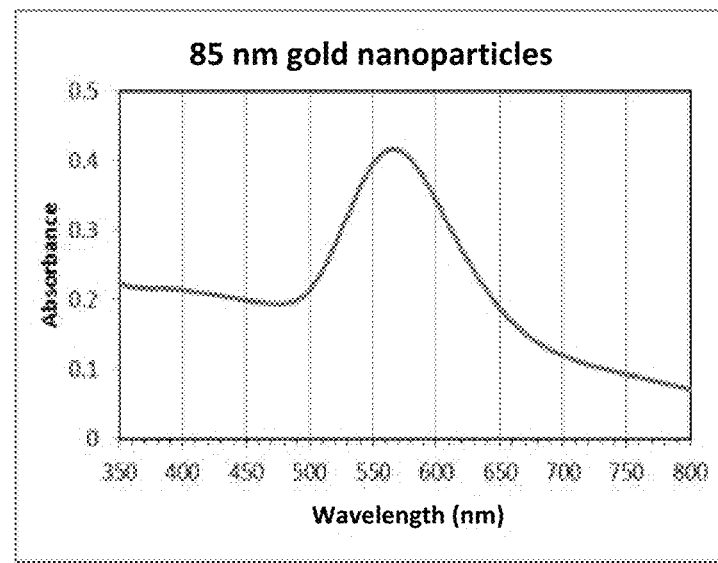

FIG. 2a shows the gold nanoparticles obtained at the end of step B) by transmission electron microscopy (TEM).

FIG. 2b shows a UV-visible spectrum of these NPs. They have a diameter of 85 nm approximately.

1.3 Preparation of a Dichromatic Material in Accordance with the Invention

An aqueous solution comprising 4.4 g of polyvinyl alcohol PVA in 100 ml of ultra pure distilled water was prepared.

The molar concentration of PVA in the aqueous solution was 1 mol/l.

Next, in a crystallizing dish having a diameter of 3 cm, 2 ml of the aqueous colloidal suspension of gold nanoparticles as prepared in example 1.2 above was mixed with 3 ml of said aqueous PVA solution. The height H of the resulting colloidal suspension in the crystallizing dish was 8 mm.

The concentration of gold in the mixture was 0.37 mmol/l.

The molar concentration of PVA in the mixture was 0.6 mol/l.

Next, the mixture was placed in an oven at 70° C. until the water had completely evaporated (10 hours approximately).

The film obtained had a thickness E of 90 μm approximately.

The film had a volume density of $1.2 \times 10^{11}$ NPs/cm$^3$ for a 90 μm film thickness E, which corresponds to a volume density of $1.08 \times 10^{10}$ NPs/cm$^3$ for a 1 mm film thickness E.

The film obtained had an optical transmission coefficient of 32% approximately, measured by a conventional UV-visible spectrometer at 490 nm.

Figure 3:
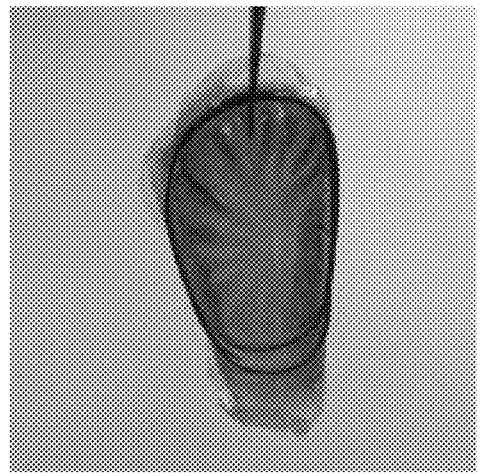
FIGS. 3a and 3b show the film which is blue in transmission (FIG. 3a) and orange in backscattering (FIG. 3b), from example 1 in accordance with one embodiment.
Figure 3:
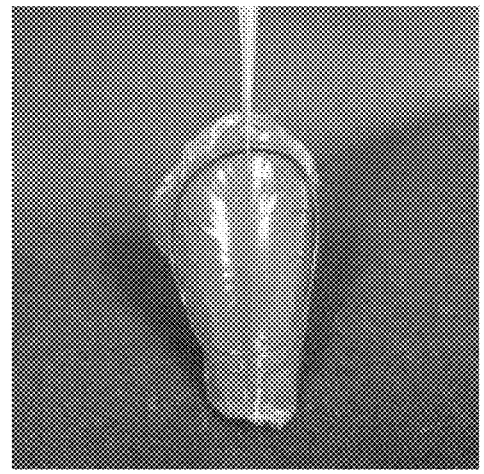

FIG. 3 shows the film which is blue in transmission (FIG. 3a) and orange in backscattering (FIG. 3b).

Example 2

Manufacture of a Dichromatic Material in Accordance with the Invention and as Obtained According to the Process in Accordance with the Invention An aqueous solution comprising 10 g of gelatin in 20 ml of ultra pure distilled water was prepared.

Next, in a crystallizing dish having a diameter of 3 cm, 3 ml of the aqueous colloidal suspension of gold nanoparticles as prepared in example 1.2 above was mixed with 2 ml of said aqueous gelatin solution. The height H of the resulting colloidal suspension in the crystallizing dish was 5 mm.

The concentration of gold in the mixture was 0.37 mmol/l.

Next, the mixture was placed in an oven at 70° C. until the water had completely evaporated (10 hours approximately).

The film obtained had a thickness E of 2 mm approximately.

The film had a volume density of $1.1 \times 10^{10}$ NPs/cm$^3$ for a 2 mm film thickness E, which corresponds to a volume density of $2.2 \times 10^{10}$ NPs/cm$^3$ for a 1 mm film thickness E.

The film obtained had an optical transmission coefficient of 20% approximately, measured by a conventional UV-visible spectrometer at 490 nm.

Figure 4:
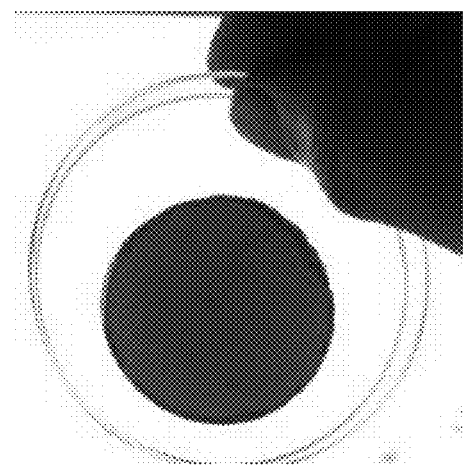
FIGS. 4a and 4b show the film which is blue in transmission (FIG. 4a) and orange in backscattering (FIG. 4b), from example 2 in accordance with one embodiment.
Figure 4:
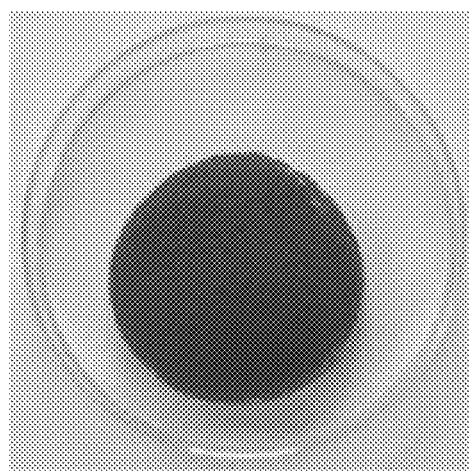

FIG. 4 shows the film which is blue in transmission (FIG. 4a) and orange in backscattering (FIG. 4b).

Comparative Example 3

Manufacture of a Material not in Accordance with the Invention

An aqueous solution comprising 6.8 mg of potassium tetrachloroaurate in 20 ml of ultra pure distilled water was prepared and brought to boiling. The concentration of $[Au^{3+}]$ gold ions in said aqueous solution was 0.9 mmol/l.

An aqueous solution comprising 100 mg of trisodium citrate in 10 ml of ultra pure distilled water was prepared. The concentration of trisodium citrate in said aqueous solution was 34 mmol/l.

0.8 ml of the aqueous sodium citrate solution were added to the 20 ml of aqueous tetrachloroaurate solution.

The resulting mixture was maintained at boiling until the gold (III) was completely reduced to gold (0) (the solution becomes brown-red), then it was cooled to ambient temperature.

An aqueous colloidal suspension of gold nanoparticles was obtained and comprised 0.86 mmol/l of gold.

Figure 5:
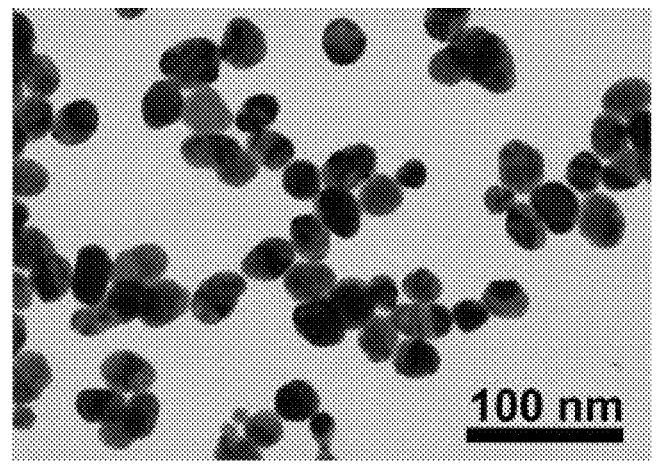
FIG. 5a shows said gold nanoparticles by transmission electron microscopy (TEM), from example 2 in accordance with one embodiment.
FIG. 5b shows the film which is violet both in transmission and in backscattering; from example 2 in accordance with one embodiment.
Figure 5:
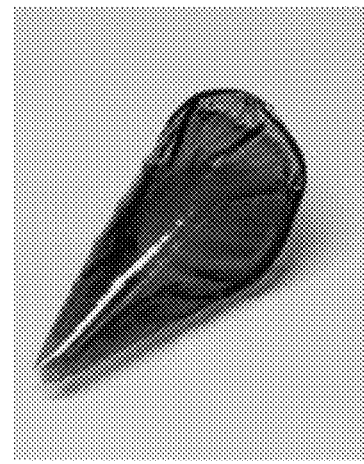

FIG. 5a shows said gold nanoparticles by transmission electron microscopy (TEM). They are roughly spherical and have a diameter of 30 nm approximately.

An aqueous solution comprising 4.4 g of polyvinyl alcohol PVA in 100 ml of ultra pure distilled water was prepared.

The molar concentration of PVA in the aqueous solution was 1 mol/l.

Next, in a crystallizing dish having a diameter of 3 cm, 2 ml of the aqueous colloidal suspension of gold nanoparticles as prepared above was mixed with 3 ml of said aqueous PVA solution. The height H of the resulting solution in the crystallizing dish was 5 mm.

The concentration of gold in the mixture was 0.35 mmol/l.

The molar concentration of PVA in the mixture was 0.6 mol/l.

Next, the mixture was placed in an oven at 70° C. until the water had completely evaporated (10 hours approximately).

The film obtained had a thickness E of 90 μm approximately.

The film obtained had an optical transmission coefficient of 40% approximately, measured by a conventional UV-visible spectrometer at 490 nm.

FIG. 5b shows the film which is violet both in transmission and in backscattering. The dichromatic effect is not therefore observed.

The invention claimed is:

1. Process for preparing a dichromatic material in the form of a dichromatic translucent film, said dichromatic material comprising monodisperse nanoparticles formed of gold and optionally of a noble metal chosen from platinum, palladium, silver and copper (NPs), and at least one organic macromolecule chosen from proteins, polysaccharides and synthetic polymers, said process comprising the following steps:
   i) a step of mixing at least one organic macromolecule chosen from proteins, polysaccharides and synthetic polymers with a colloidal suspension $S_0$ of NPs, and ii) a step of drying the mixture from step i), in order to form a dichromatic material in the form of a translucent film deposited on a support, wherein:
   the NPs are in spherical form and have a diameter ranging from 70 to 100 nm, the molar concentration of gold in the mixture from step i) ranges from $10^{-4}$ to $5\times10^{-1}$ mol/l, the molar concentration of macromolecule in the mixture from step i) ranges from 0.001 to 5 mol/l, the film has a volume density ranging from $0.5\times10^{10}$ to $5.0\times10^{10}$ NPs/cm$^3$ for a 1 mm film thickness E, and said NPs imparting said material with a dichromatic optical effect producing two different colours, one colour when light transmits from behind the material and a different colour when light contacts the material from the same side as an observer, such that said material produces a one first colour in transmission when light from a behind the material passes through said material and one second colour in backscattering when light from the opposite direction reflects off of said material from said same side as said observer, and wherein said first and said second colours are complimentary and produce together a neutral grey colour.

2. Process according to claim 1, wherein the film has a thickness E ranging from 10 μm to 10 mm.

3. Process according to claim 1, wherein the support is a transparent or translucent substrate.

4. Process according to claim 3, wherein the transparent or translucent substrate is made of glass, glass-ceramic, ceramic, plastic or cellulose paper.

5. Process according to claim 1, wherein the colloidal suspension $S_0$ comprises from $10^{-4}$ to $5\times10^{-1}$ mol/l of gold.

6. Process according to claim 1, wherein step i) is carried out by mixing in a container comprising at least one inner surface suitable for receiving said mixture:

said colloidal suspension $S_0$ comprising NPs, said colloidal suspension $S_0$ comprising from $10^{-4}$ to $5\times10^{-1}$ mol/l of gold, with a solution $S_0'$ comprising said organic macromolecule, said solution $S_0'$ comprising from $10^{-3}$ to 5 mol/l of organic macromolecule, it being understood that:

the volume ratio: volume of the colloidal suspension $S_0$/volume of the solution $S_0'$ ranges from 0.1 to 100, and the resulting suspension has a height H in the container ranging from 0.1 to 30 mm.

7. Process according to claim 1, wherein said process additionally comprises, between step i) and step ii), a step i-1) of applying the mixture from step i) to said support.

8. Process according to claim 6, wherein the inner surface of said container acts as support for step ii) and step ii) is carried out by directly drying said container comprising said mixture.

9. Process according to claim 1, wherein step ii) is carried out at a temperature ranging from 50° C. to 150° C.

10. Process according to claim 1, wherein said process additionally comprises, after step ii), a step iii) of heat treatment at a temperature ranging from 20° C. to 200° C.

11. Process according to claim 1, wherein said process additionally comprises, after step ii) or after step iii), a step iv) during which the film of dichromatic material is removed or unstuck from said support.

12. Process according to claim 1, wherein the colloidal suspension $S_0$ is prepared beforehand according to the following steps:

A) a step of preparing a colloidal suspension comprising seeds of a metal chosen from gold, platinum, palladium, copper and silver, said metal seeds being in spherical form and having a diameter ranging from 1 to 30 nm, said aqueous colloidal suspension comprising a molar concentration of metal ranging from $5\times10^{-5}$ mol/l to $10^{-2}$ mol/l, and B) a step of preparing said colloidal suspension $S_0$ from the colloidal suspension comprising seeds from step A).

13. Process according to claim 12, wherein step A) is carried out by the Turkevich-Frens method, by radiolysis or by irradiation.

14. Process according to claim 12, wherein the seeds are gold seeds and step A) comprises:

a substep $A_1$) of heating to boiling point a solution $S_1$ comprising at least one gold salt in which the gold is in the (+III) or (+I) oxidation state, the molar concentration of [Au$^{3+}$] or [Au$^+$] gold ions in said aqueous solution $S_1$ ranging from $5\times10^{-5}$ mol/l to $10^{-2}$ mol/l, a substep $A_2$) of mixing the solution $S_1$ from substep $A_1$) with a solution $S_2$ comprising at least one reducing agent and optionally a stabilizer, the molar concentration of reducing agent in said solution $S_2$ [Reducing agent] ranging from $5\times10^{-5}$ mol/l to $5\times10^{-1}$ mol/l, it being understood that the molar ratio: number of moles of reducing agent/number of moles of Au$^{3+}$ or Au$^+$ gold ions ranges from 0.1 to 20, a substep $A_3$) of maintaining the heating to boiling point of the mixture from substep $A_2$) until the gold (III) or the gold (I) has been completely reduced to gold (0), and a substep $A_4$) of cooling to ambient temperature in order to obtain said colloidal suspension comprising gold seeds.

15. Process according to claim 12, wherein the seeds are gold seeds and step B) comprises:

a substep $B_1$) of heating to boiling point a solution $S_3$ comprising at least one gold salt in which the gold is in the (+III) or (+I) oxidation state, the concentration of [Au$^{3+}$] or [Au$^+$] gold ions in said solution $S_3$ ranging from $10^{-4}$ mol/l to 0.1 mol/l, a substep $B_2$) of mixing the solution $S_3$ from substep $B_1$) with the colloidal suspension comprising seeds as obtained in step A) or in substep $A_4$), it being understood that the molar ratio defined by the number of moles of Au$^{3+}$ or Au$^+$ gold ions of the solution $S_3$/the number of moles of Au$^0$ gold of the colloidal suspension of gold seeds ranges from 5 to 1000, a substep $B_3$) of mixing a solution $S_4$ comprising at least one reducing agent and optionally a stabilizer with the mixture from substep $B_2$), the concentration of reducing agent in said solution $S_4$ [Reducing agent] ranging from $2\times10^{-5}$ mol/l to 2 mol/l, it being understood that the molar ratio: number of moles of reducing agent/number of moles of Au$^{3+}$ or Au$^+$ gold ions ranges from 0.1 to 10, a substep $B_4$) of maintaining the heating to boiling point of the mixture from substep $B_3$) until the gold (III) or the gold (I) has been completely reduced to gold (0), and a substep $B_5$) of cooling to ambient temperature in order to obtain said colloidal suspension $S_0$.

16. Dichromatic material in the form of a translucent film as obtained according to the process defined in claim 1, said dichromatic material comprising NPs and at least one organic macromolecule chosen from proteins, polysaccharides and synthetic polymers, wherein said material has two complementary colours distinct to the naked eye, one colour in transmission and one colour in backscattering and in that:

the NPs are in spherical form and have a diameter ranging from 70 to 100 nm, and said film has a volume density ranging from $0.5 \times 10^{10}$ to $5.0 \times 10^{10}$ NPs/cm$^3$ for a 1 mm film thickness E.

17. Material according to claim 16, wherein said material has a thickness E ranging from 10 µm to 10 mm.

18. A dichromatic material in the form of a translucent film as defined in claim 16, wherein said material is a coating a transparent or translucent substrate.

19. A dichromatic material according to claim 18, wherein the transparent or translucent substrate is made of glass, glass-ceramic, ceramic, plastic or cellulose paper.

20. A dichromatic material in the form of a translucent film as defined in claim 16, is a means of authentication, decoration or protection.

* * * * *